United States Patent
Shah et al.

(10) Patent No.: US 12,438,792 B2
(45) Date of Patent: Oct. 7, 2025

(54) PER-APPLICATION NETWORK PERFORMANCE ANALYSIS

(71) Applicant: Arista Networks, Inc., Santa Clara, CA (US)

(72) Inventors: Sandip Shah, Fremont, CA (US); Vlad Hanciuta, Dublin (IE); Sameer Mahajan, Pune (IN); Andrii Rykhlivskyi, Limerick (IE); Sundar Bettadahalli, Pleasanton, CA (US)

(73) Assignee: Arista Networks, Inc., Santa Clara, CA (US)

( * ) Notice: Subject to any disclaimer, the term of this patent is extended or adjusted under 35 U.S.C. 154(b) by 323 days.

(21) Appl. No.: 18/160,702

(22) Filed: Jan. 27, 2023

(65) Prior Publication Data

US 2024/0259286 A1    Aug. 1, 2024

(51) Int. Cl.
*H04L 43/0864*    (2022.01)
*H04L 43/028*    (2022.01)
*H04L 43/0888*    (2022.01)
*H04L 43/16*    (2022.01)

(52) U.S. Cl.
CPC ........ *H04L 43/0864* (2013.01); *H04L 43/028* (2013.01); *H04L 43/0888* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 7,957,315 B2 | 6/2011 | Duffield et al. | |
| 9,426,139 B1* | 8/2016 | McClintock | G06F 21/40 |
| 2020/0099630 A1 | 3/2020 | Stolarchuk et al. | |
| 2021/0111946 A1 | 4/2021 | Wang et al. | |
| 2021/0218647 A1 | 7/2021 | Rangarajan et al. | |
| 2021/0218651 A1 | 7/2021 | Rangarajan et al. | |
| 2022/0191085 A1* | 6/2022 | Li | H04N 21/812 |
| 2022/0294712 A1 | 9/2022 | Rangarajan et al. | |
| 2024/0095111 A1* | 3/2024 | Chawla | G06F 11/079 |

\* cited by examiner

*Primary Examiner* — Angela Nguyen
(74) *Attorney, Agent, or Firm* — Treyz Law Group, P.C.; Tianyi He (57) ABSTRACT

A network traffic analysis device may be configured to receive network performance metrics data for network traffic flows. The network traffic analysis device may further be configured to receive application information for an application indicative of a subset of the network traffic flows belonging to the application and to aggregate the network performance metrics data for the subset of the network traffic flows to obtain aggregated network performance metrics data for the application. By analyzing network performance metrics data in this aggregated manner, the network traffic analysis device can provide further insights into patterns of network issues experienced by the application and/or by one or more services of the application.

20 Claims, 7 Drawing Sheets

| | 38-1 | 38-M |
|---|---|---|
| APPLICATION SERVICE 1 | APPLICATION SERVICE 2 | ... |
| PACKET COUNT INFORMATION | PACKET COUNT INFORMATION | PACKET COUNT INFORMATION |
| BYTE INFORMATION | BYTE INFORMATION | BYTE INFORMATION |
| PER-HOP LATENCY INFORMATION | PER-HOP LATENCY INFORMATION | PER-HOP LATENCY INFORMATION |
| DEVICE QUEUE LENGTH INFORMATION | DEVICE QUEUE LENGTH INFORMATION | DEVICE QUEUE LENGTH INFORMATION |
| DEVICE INTERFACE LATENCY INFORMATION | DEVICE INTERFACE LATENCY INFORMATION | DEVICE INTERFACE LATENCY INFORMATION |
| ROUNDTRIP LATENCY INFORMATION | ROUNDTRIP LATENCY INFORMATION | ROUNDTRIP LATENCY INFORMATION |
| RETRANSMISSION INFORMATION | RETRANSMISSION INFORMATION | RETRANSMISSION INFORMATION |
| CONGESTION NOTIFICATION INFORMATION | CONGESTION NOTIFICATION INFORMATION | CONGESTION NOTIFICATION INFORMATION |
| TCP WINDOW INFORMATION | TCP WINDOW INFORMATION | TCP WINDOW INFORMATION |
| ... | ... | ... |

(labels 40, 42, 44, 46, 48, 50, 52, 54, 56, 58, 60 point to successive rows; table numbered 36)

PER-APPLICATION NETWORK PERFORMANCE ANALYSIS

BACKGROUND

A communication system includes multiple network devices that are interconnected to form a network for conveying network traffic (e.g., data packets) from source devices to destination devices. The network traffic may contain data for numerous different services belonging to various applications.

DETAILED DESCRIPTION

A communications network can convey network traffic, e.g., in the form of packets having packet headers encapsulating application data, between hosts. The application data being conveyed may belong to a variety of services or processes, groups of which further belong to various applications. Because the network often contains network traffic belonging to different applications, it may be difficult to diagnose and resolve issues with any particular application (e.g., determine whether the application issues such as reachability or slowness are due to the network or the application itself).

To provide users or network operators with enhanced insight regarding any particular application and/or network performance in general, a network analysis device can organize multiple network performance metrics for different network flows on a per-application basis. The network analysis device may also identify anomalous events based on one or more types of these network performance metrics for any applications, as desired. Especially for some illustrative networks such as data center networks (DCNs), wide area networks (WANs) or specifically software-defined wide area networks (SD-WANs), or other networks handling traffic flow for a large number of different services and/or applications, providing network performance information, analysis, and/or reporting on a per-application basis may provide users or network operators with clear and concise network performance information with which application issues can be diagnosed and resolved. An illustrative network for which per-application metrics data aggregation, analysis, and/or reporting can be performed by a network analysis device is shown in FIG. 1.

Figure 1:
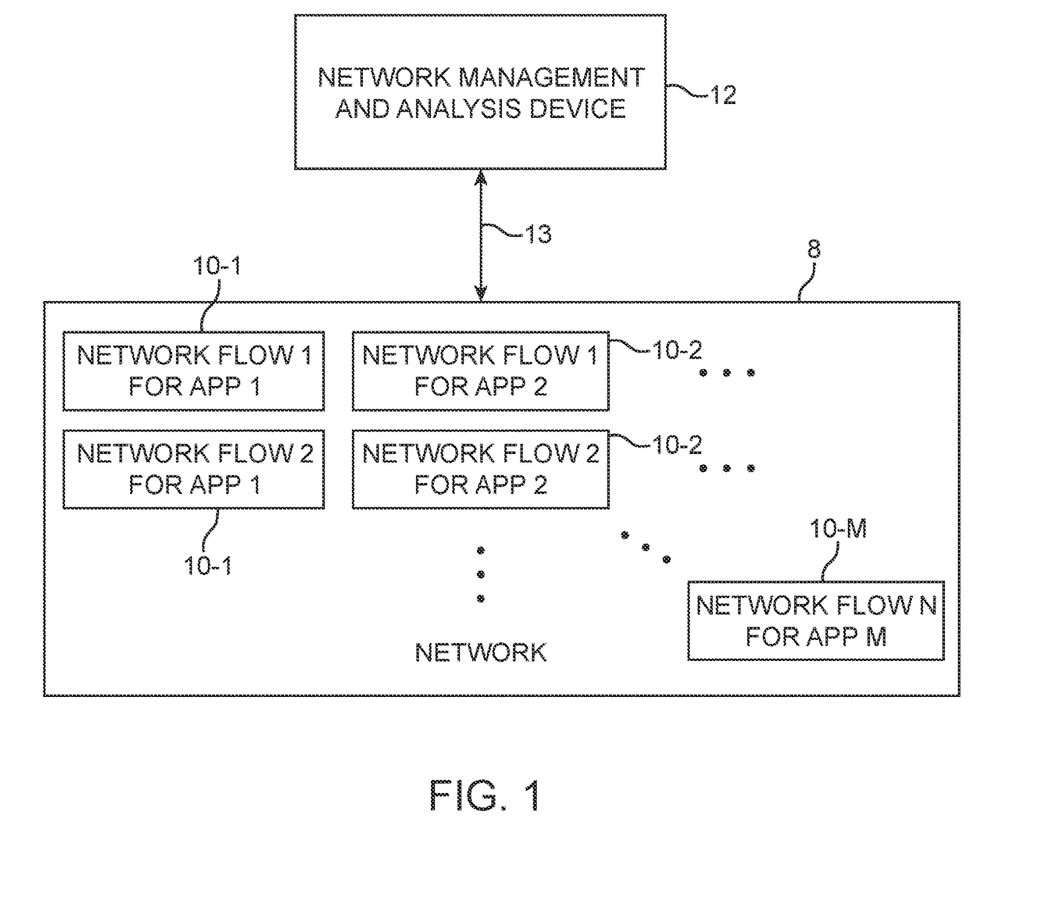
FIG. 1 is a diagram of an illustrative network through which network traffic for different applications are conveyed in accordance with some embodiments.

FIG. 1 is a diagram of an illustrative networking system with a communications network 8. Network 8 may be implemented to span a range of geographical locations or generally be implemented with any suitable scope. In some configuration described herein as an illustrative example, network 8 may include a data center network, a wide area network or a software-defined wide area network, and/or other networks. In general, network 8 may include one or more wired portions with network devices interconnected based on wired technologies or standards such as Ethernet (e.g., using copper cables and/or fiber optic cables), one or more wireless portions implemented by wireless network devices (e.g., to form wireless local area network (WLAN) or Wi-Fi networks). If desired, network 8 may include internet service provider networks (e.g., the Internet) or other public service provider networks, private service provider networks (e.g., multiprotocol label switching (MPLS) networks), and/or may other types of networks such as telecommunication service provider networks (e.g., a long-term evolution (LTE) network).

Regardless of the scope of network 8, network 8 may be used to convey network traffic containing application data for multiple applications running on host equipment (sometimes referred to herein as host devices or simply hosts) serving as sources of the application data and/or destinations for the application data. As an example, some host equipment serving as the client may receive application data for an application from other host equipment serving as the server. Each host equipment may run one or more applications such as software applications executed on processing circuitry of the host equipment. The execution of each application may include the execution of one or more processes or services for that application (e.g., executed on the processing circuitry as part of the execution of the application). The execution of each process or service may include the conveyance of one or more separate streams of network traffic, with each stream containing network packets from the same source host equipment to the same destination host equipment. Each stream of these network packets from the same source host equipment to the same destination host equipment for the same process or service may sometimes be referred to herein as a network flow or network traffic flow.

As shown in FIG. 1, network 8 may convey one or more network flows 10 for each application. Each network flow 10 for the same application may belong to the same service (or generally process) or may belong to different services (or generally processes) for that application. In the example of FIG. 1, network 8 may convey one or more network flows 10-1 for a first application, one or more network flows 10-2 for a second application, and/or generally any suitable number of network flows 10 for any suitable number of applications (e.g., one or more network flows 10-M for an Mth application). Each host equipment communicatively coupled to network 8 may serve as the source host equipment for any number of these network flows and/or may serve as the destination host equipment for any number of these network flows. In general, network flows 10 for the same (client-side or server-side) application running on a given host equipment may all be sourced or originate from the host equipment but may be destined for and conveyed to any number of other different host equipment through varying network paths in network 8.

The networking system of FIG. 1 may contain a network management and analysis device 12 (sometimes referred to herein simply as network analysis device 12 or network traffic analysis device 12 in scenarios where its network analysis functionalities are being highlighted with or without its management functionalities). Network management and analysis device 12 may be communicatively coupled to components belonging to or associated with network 8 via one or more network paths 13. As an example, network 8 may include one or more switches and one or more controllers for controlling the operations of the one or more switches. Network management and analysis device 12 may be communicatively couple to each of the one or more switches and/or the one or more controllers via one or more network paths 13, thereby sending and/or receiving control signals, network data such as network performance metrics data or other information indicative of network performance, and/or other types of data or signals through path(s) 13.

While network management and analysis device 12 may receive certain network performance metrics and/or other information indicative of network performance, it may be difficult to directly correlate the received information to performance of network flows associated with any given application. To overcome these limitations, network management and analysis device 12 may obtain, via one or more network paths 13, a variety of different performance metrics for different network flows in network 8 and information associating or correlating each network flow to corresponding services or processes and therefore the applications to which the services or processes belong. Network management and analysis device 12 may, based on the obtained performance metrics and application information, be configured to organize (e.g., aggregate) performance metrics data for different network flows on a per application basis such that an associated set of aggregated metrics data can be used to characterize network performance of each application.

Figure 2:
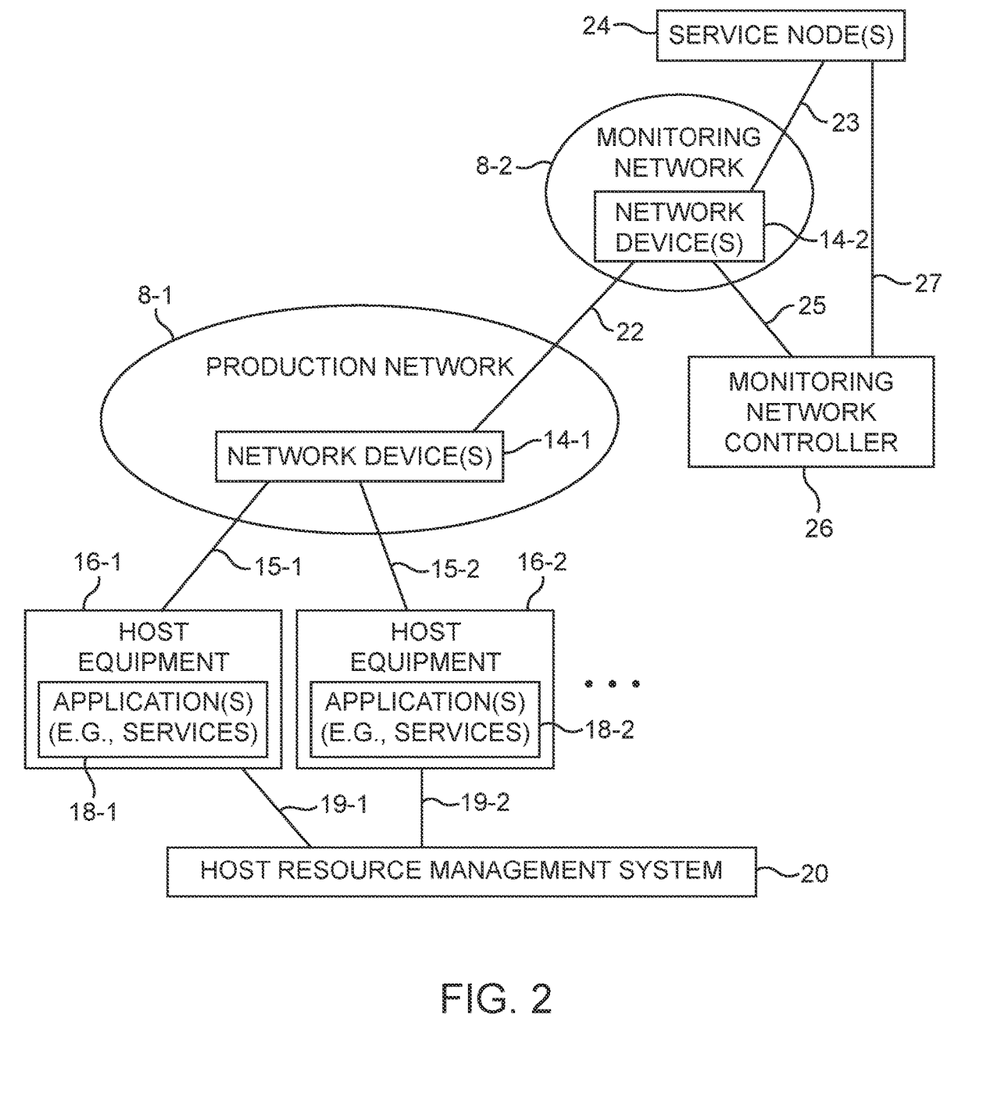
FIG. 2 is a diagram of an illustrative networking system having production network components and monitoring network components in accordance with some embodiments.

FIG. 2 is a diagram of an illustrative network configuration (e.g., for implementing network 8 in FIG. 1). As shown in FIG. 2, an illustrative network such as network 8 in FIG. 1 may contain a production network such as production network 8-1 and a network traffic monitoring network such as monitoring network 8-2 coupled to production network 8-1. Monitoring network 8-2 may sometimes be referred to herein as analysis network 8-2, packet monitoring network 8-2, monitoring switch fabric 8-2, or monitoring fabric 8-2. Production network 8-1 may sometimes be referred to herein as forwarding network 8-1, production switch fabric 8-1, or production fabric 8-1. Production network 8-1 may, for example, be implemented locally (e.g., at a particular geographic location such as a school or college campus, server or data farm, building, business campus, airport, hospital, other locations having networks managed by one or more network administrators, etc.) or may be distributed across multiple geographic locations. Monitoring network 8-2 may, for example, be implemented locally (e.g., at the same geographic location as part or all of production network 8-1), may be implemented at a different geographic location than production network 8-1 (e.g., may be remote from network 8-1), or may be distributed across multiple locations, if desired.

Production network 8-1 may include network devices 14-1 that forward network traffic between end hosts of production network 8-1 implemented on host equipment 16, such as host equipment 16-1, host equipment 16-2, etc., each running one or more services for one or more applications 18. While not explicitly shown in FIG. 1, a network of network devices 14-1 may be interconnected with one another within network 8-1 via network paths coupled between corresponding ports of network devices 14-1. Edge network devices 14-1 may be coupled to host equipment 16 via corresponding paths 15 (e.g., one or more paths 15-1 coupled to host equipment 16-1, one or more paths 15-2 coupled to host equipment 16-2, etc.).

Network monitoring devices such as network tap devices may be used to tap (e.g., sample) network traffic flows in production network 8-1 by sending copies of network packets and/or metadata of the network traffic flows such as packet header information, network packet statistics, network flow statistics, etc., observed by the tap devices to monitoring network 8-2 via one or more paths 22 (sometimes referred to herein as tap paths). The network tap devices may be interposed between and/or on network devices 14-1 to monitor network traffic between end hosts. As examples, a network tap device may be implemented on a network device 14-1 to monitor traffic that pass through the network device, may be interposed between ports of first and second switches to monitor traffic between the first and second switches, and/or may generally be placed along production network paths in network 8-1 to monitor and sample production network traffic and/or obtain network traffic metadata. In general, the network tap devices may monitor traffic without interfering with network traffic flow in network 8-1.

In some configurations described herein as an illustrative example, the sampled or tapped network flows and/or the metadata collected for these network flows may belong to applications (e.g., or more specifically to their constituent services) such as network flows 10 for applications 1, 2, . . . , M in FIG. 1.

Monitoring network 8-2 may include network devices 14-2 that are controlled by monitoring network controller 26 via control paths 25. If desired, network devices 14-1 of production network 8-1 may also communicate with controller 26 or may communicate with a different controller (not shown) to receive control and/or configuration data for implementing network policy.

Ports of network devices 14-1 that are coupled to tap paths 22 may sometimes be referred to as filter ports, ingress interfaces, or ingress ports of monitoring network 8-2 because these device ports serve to interface with incoming network traffic to network devices 14-2. A controller (e.g., controller 26 and/or another controller that controls the operation of network devices 14-1) may control network devices 14-1 and 14-2 to forward copied network traffic (sometimes referred to herein as tapped traffic or tapped packets) to desired end hosts of network 8-2 (e.g., to one or more service nodes 24) and/or to controller 26.

While not explicitly shown in FIG. 1, a network of network devices 14-2 may be interconnected with one another within network 8-2 via network paths coupled between corresponding ports of network devices 14-2. In particular, network devices 14-2 may convey tapped network traffic from production network 8-1 along network paths in monitoring network 8-2 to one or more service nodes 24 (serving as end hosts of network 8-2) via one or more corresponding paths 23. As examples, service node(s) 24 may include one or more packet recorders for network traffic storage or other devices for network traffic metadata storage, one or more service devices, one or more analysis devices, and/or one or more traffic monitoring devices, etc.

Controller 26 may control network devices 14-2 via paths 25 and/or service node(s) 24 via paths 27 to help ensure efficient utilization of network monitoring resources.

The analysis devices at service nodes 24 may perform network analysis operations on traffic tapped from production network 8-1. The service devices at service nodes 24 may perform network service operations on traffic tapped from production network 8-1. Analysis devices and service devices may be coupled to network devices 14-2 of monitoring network 8-1 via corresponding paths 23. As examples, the analysis devices may include network analysis tools such as network performance monitors, network capacity analysis tools, network outage analysis tools, or other network analysis tools for analyzing production network 8-1 based on tapped network traffic flows forwarded by network devices 14-2. The service devices may serve to manipulate the tapped network traffic flows prior to analysis by the analysis devices, if desired. In particular, the service devices may manipulate network traffic flows by replacing, removing, or otherwise modifying information stored in network packets of the traffic flows. The service devices may, for example, include packet slicing tools, time-stamping tools, or other tools implemented using computing equipment. Multiple tools may be implemented on a service device at a given service node 24.

The traffic monitoring devices (at service nodes 24) may serve to perform traffic monitoring operations on traffic flows in production network 8-1 based on tapped traffic flows. The traffic monitoring devices may similarly be coupled to network devices 14-2 in monitoring network 8-1 via corresponding paths 23. The traffic monitoring devices may include network traffic monitoring tools such as network visibility tools or other network monitoring tools for monitoring traffic (e.g., network packets) in production network 8-1. Visibility tools on the traffic monitoring devices may include, for example, application performance monitoring tools (e.g., tools that monitor the performance of software applications running on end hosts 16 and/or of switches 14-1 of production network 8-1), security tools (e.g., tools for monitoring the security of production network 8-1 and network traffic through production network 8-1), or any other desired monitoring tools.

The analysis devices, service devices, traffic monitoring devices, data recorder devices, and/or other types of service nodes 24 may be formed on separate hosts (e.g., separate computers, servers, or other end hosts of monitoring network 8-2) or two or more of these service node devices may be formed on the same (shared) host (e.g., the same computer, server, etc.). If desired, two or more of these service node devices may be implemented on separate integrated circuits or using separate processors and storage on the same computer or server (e.g., on the same end host of monitoring network 8-2). One or more of these types of service node devices (e.g., analysis devices, service devices, monitoring devices, etc.) may be omitted if desired. If desired, the analysis devices, service devices, traffic monitoring devices, data recorder devices, and/or other types of service nodes 24 may form portions of network analysis device 12 and/or may supply network analysis device 12 with desired performance metrics data (e.g., generated based on tapped network traffic that has been processed or serviced by a service device, generated based on an initial analysis of tapped network traffic or metadata, etc.).

Network devices 14-1 in network 8-1 and network devices 14-2 in network 8-2 (sometimes referred to collectively as network devices 14) may include any suitable number and/or type of network devices interconnected via corresponding port-to-port (or generally interface-to-interface) connections. As examples, network devices 14 may include one or more switches, one or more bridges, one or more routers and/or gateways, one or more hubs, one or more repeaters, one or more firewalls, one or more wireless access points, one or more devices serving other networking functions, one or more devices that include the functionality of two or more of these devices, and management equipment that manage and control the operation of one or more of these network devices.

In illustrative configurations described herein as an example, network devices 14 may primarily include switches or generally packet processing systems each including a control plane processor and/or packet processors such as switch integrated circuits implemented on line cards. One or more line cards may contain supervisory processing circuitry configured to control the operation of the switches. These line cards may be interconnected via a backplane and integrated within a shared housing. If desired, network devices 14 may (additionally or alternatively) include switches or generally packet processing systems that are separately implemented or housed and that each contain separate control plane processing circuitry coupled to one or more high-speed switching integrated circuits. The control plane processing circuitry may include a central processing unit or microprocessor and corresponding memory. The switch integrated circuits may be dedicated switching circuits that are capable of handling packet processing tasks at high speeds.

In general, network devices 14-1 may forward production network traffic (e.g., network flows 10 in FIG. 1) between end hosts 16 in network 8-1. Network devices 14-2 may forward tapped network traffic and/or metadata information regarding the production network traffic (e.g., header information, statistics, latency information, and/or other network traffic information) to one or more service nodes 24 for store and/or analysis.

Host equipment forming the end hosts for networks 8-1 and/or 8-2 (e.g., any of host equipment 16-1, 16-2, . . . , computing equipment on which service nodes 24 are implemented, controller 26, a different controller for controlling switches 14-1, host resource management system 20, etc.) can include computers, servers (e.g., server computing equipment housed in server racks), portable electronic devices such as cellular telephones, laptops, etc., and/or any other suitable types of specialized or general-purpose host computing equipment, e.g., each running one or more client-side and/or server-side applications.

In some illustrative configurations described herein as an example, at least some of host equipment 16 (e.g., host equipment 16-1, 16-2, etc.) may be implemented on corresponding server computing equipment (e.g., housed in one or more server racks) that execute applications 18, e.g., each containing services running on one or more virtual machines, that provide corresponding network flows 10 through network devices 14-1 in production network 8-1 to other end hosts of network 8-1 (e.g., client devices such as computers, portable electronic devices, etc.). In this example, host resource management system 20 (sometimes referred to herein as host resource management circuitry implemented on computing equipment) may be configured to instantiate and/or otherwise manage the creation and destruction of computing resources such as virtual machines formed on host equipment 16-1, 16-2, etc., via corresponding control paths 19-1, 19-2, etc.

In one illustrative arrangement, host resource management system 20 may be configured to control and orchestrate distributed computing resources implemented at various parts of host equipment 16, e.g., housed across one or more server racks. Each application 18 may be implemented on separate and/or shared computing equipment (e.g., on different or the same server computing equipment or other suitable types of computing hardware). Resource management circuitry 20 may configure the computing equipment to provision corresponding computing resources (e.g., configure the computing resources to be useable to perform a compute function, a storage function, a management function, and/or any other functions) for use by each service or application, to instantiate the corresponding computing resources (e.g., create instances of computing resources having the compute, storage, management, and/or other functions, create one or more virtual machines, etc.), to remove computing resources, and/or otherwise modify the configuration of the computing resources.

While the various components belonging to and/or coupled to monitoring network 8-2 may provide tapped production network traffic and/or analyze network performance of production network components. This type of analysis may not be as useful in providing network performance insight for any specific application, especially considering that production network 8-1 may include network traffic containing application data for numerous services or processes, some belonging to the same application and others belonging to different applications.

To further enhance network performance monitoring and/or analysis to especially provide insight for any given application, a networking system may include a network analysis device such as network management and analysis device 12 communicatively coupled to the various components associated with the organization of application services and their workloads, the conveyance of the network flows for the applications across the production network, and the tapping production network flows and/or the collection of network flow metadata information for the monitoring network.

Figure 3:
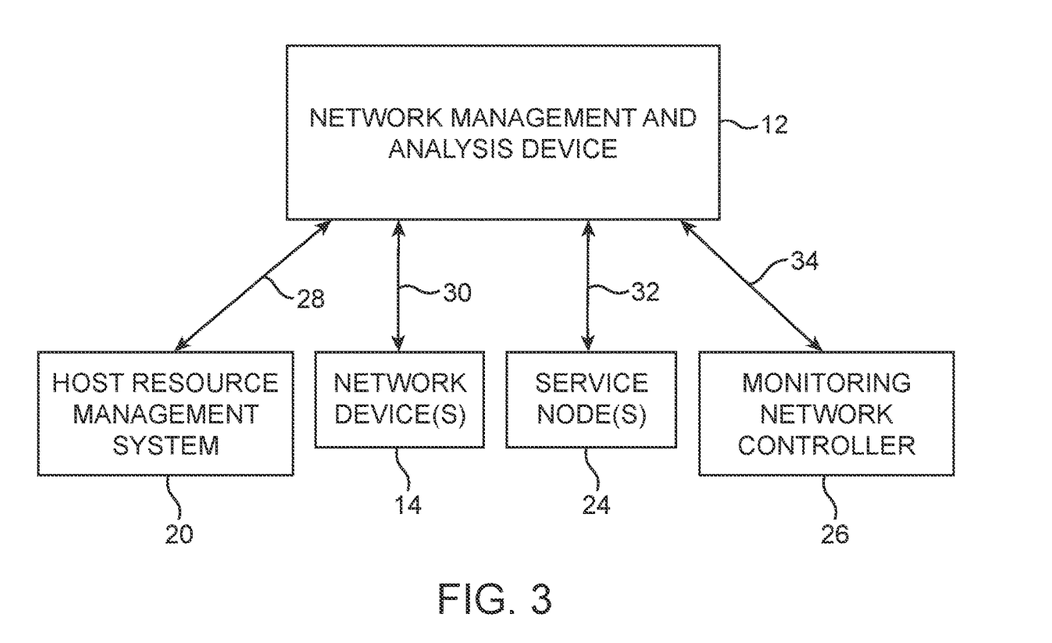
FIG. 3 is a diagram of an illustrative network management and analysis device communicatively coupled to one or more network components in accordance with some embodiments.

FIG. 3 is a diagram of an illustrative network management and analysis device 12 configured to obtain application (workload) information and/or network performance metrics from one or more systems, devices, and/or elements such as those in the illustrative network configuration of FIG. 2. In the example of FIG. 3, the network analysis device may be communicatively coupled to one or more (e.g., all) of host resource management system 20, network devices 14 (e.g., in network 8-1 and/or network 8-2), service nodes 24, monitoring network controller 26, and/or other elements in the networking system to obtain application (workload) information and/or network performance metrics for each network flow.

Network analysis device 12 may be coupled to host resource management system 20 via communication path 28, coupled to one or more network devices 14 via corresponding communication paths 30, coupled to one or more service nodes 24 via corresponding communication paths 32, and coupled to controller 26 via communication path 34. Communication paths 28, 30, 32, and 34 may each be a direct path in which a wired connector connects network analysis device 12 to the corresponding element at opposing ends of the connector or may be an indirect path in which other intervening network elements are present along the communication path. If desired, communication paths 28, 30, 32, and 34 may include software paths (e.g., in scenarios in which network analysis device 12 and the corresponding element are implemented on common hardware such as shared processing circuitry or server computing equipment).

In some illustrative arrangements, communication paths 28, 30, 32, and 34 may include one or more of network paths 15, 19, 22, 23, 25, 27 and network paths interconnecting network devices 14-1 and interconnecting network devices 14-2 (as described in connection with FIG. 2).

Depending on the type of data, network analysis device 12 may obtain the data from different sources and/or at different time intervals. As a first example, network analysis device 12 may receive application host resource information indicating the distribution of applications or more specifically their services across host equipment 16 from host resource management system 20 via communication path 28. In particular, host resource management system 20 may generate the application host resource information based on tags or labels for each workload and/or a name for the workload (e.g., as supplied by a user or network administrator). The tags, labels, and/or names may be indicative of the application of the workload. As examples, the application host resource information may include identifiers (e.g., names) for the applications, the workloads running for each application (e.g., for the services of each application), and the network addresses of or other identifying information for the workloads. By receiving the application host resource information, network analysis device 12 may be configured to associate network flows having source or destination addresses matching those of the workloads to the application containing the workloads. In such a manner, each network flow such as those in network flows 10 in FIG. 1 can be correlated to a particular application based on the application host resource information.

In other words, the application host resource information may be indicative of the distribution of one or more different workloads for each service in each application 18 across different parts of host equipment 16. Each workload may be running (executing) on different host equipment processing circuitry (e.g., on one or more processors of host equipment 16-1, on one or more processors of host equipment 16-2, etc.). The network address of the workloads may be the different network addresses of the different parts of the host equipment.

In particular, host resource management system 20 may receive and store the application host resource information identifying, for each application, one or more network addresses such as IP addresses, L4 port numbers, network protocol, etc., and/or other network information such as edge switch interfaces of corresponding host equipment running portions of each service for that application. Each of network flows 10 (FIG. 1) from the identified one or more network addresses (e.g., IP address, L4 port number, etc.) can be attributed to that application.

If desired, network analysis device 12 may (periodically) query host source management system 20 for the application host resource information, may subscribe to receive updates from host source management system 20 when the application host resource information has been updated, may receive the application host resource information or updates to the application host resource information based on a criterion being met, and/or may generally receive the application host resource information in any suitable manner with any suitable periodicity.

As a second example, network analysis device 12 may receive IPFIX (IP flow information export) metrics data from one or more network switches 14. For example, the received IPFIX metrics data may include network flow metrics such as number of packets, bytes, latency information such as round-trip time and service response time, delay, jitter, and/or other metrics collected on a per-network-flow basis (e.g., each record includes the network performance metrics information and the corresponding network flow information such as source and IP destination addresses, source and destination L4 ports, and protocol specifying the particular network flow for which the metrics are collected).

Network analysis device 12 may include and/or implement a collector system that receives IPFIX metrics data from the one or more network devices 14 via one or more communication paths 30. If desired, the collector system may be implemented elsewhere in the networking system such as at one or more data recorders implementing service nodes 24, at other types of devices implementing service nodes 24, at a controller such as controller 26 or another controller. Accordingly, network analysis device 12 may receive the IPFIX metrics data from the separately implemented collector system. In other illustrative arrangements, non-IPFIX metadata (e.g., NetFlow metrics data, sFlow metrics data, etc.) for network flows may be collected by one or more network devices 14 and received by network analysis device 12.

Because the network flow metrics data generated by network devices 14-1 and received at network analysis device 12 specifies the network flow information (e.g., source and IP destination addresses, source and destination L4 ports, and protocol), network analysis device 12 may further identify the network paths (e.g., through which of network devices 14-1) each network flow traverses based on the number of packets, bytes, and/or other metrics data generated at any given network device 14-1. Using the application host resource information (which associates a network flow to a service and/or application), network analysis device 12 may further correlate the collected IPFIX (or non-IPFIX) metadata and network traversal path for each network flow to a particular service and/or application.

If desired, network analysis device 12 may also perform packet drop analysis using the number of packets collected from an opposing pair of edge network devices 14-1 (and/or any other network devices) for each network flow. In other words, network analysis device 12 may compare the number of packets, for a given network flow, entering network 8-1 reported at a first edge device and the number of packets, for the given network flow, exiting network 8-1 reported at a second edge device to generate an indication (e.g., estimate) of the number of packets drop that has occurred for the given network flow. Using the application host resource information (which associates a network flow to a service and/or application), network analysis device 12 may similarly correlate the packet drop information for each network flow to a particular service and/or application.

In some illustrative configurations, network analysis device 12 may periodically (e.g., based on an expiry of a timer or a criterion being met at a given network device 14-1) receive the IPFIX (or non-IPFIX) metadata from each network device 14-1 and/or from a collector service node 24 of the IPFIX (or non-IPFIX) metadata.

As a third example, network analysis device 12 may receive device interface information and/or device queue information from one or more network devices 14-1 via one or more communication paths 30. For example, one or more network devices 14-1 may each convey, for one or more of its interfaces, an interface latency such as the latency experienced by a packet exiting the output interface of that network device 14-1, and may each convey, for one or more of its queues, a queue length such as a number of packets in queue (e.g., waiting to be forwarded or sent via an interface).

In some illustrative arrangements, network analysis device 12 may identify specific network devices 14-1 and their device interfaces and/or queues through network flows 10 traverses and subscribe to receive the device interface latency and/or device queue length of the traversed interfaces and/or queues from the identified network devices 14-1. If desired, the conveyance of the interface and queue information to network analysis device 12 may be based on thresholds being met (e.g., when the interface latency exceeds a threshold value, when the queue length exceeds a threshold value). Using the received application host resource information (which associates a network flow to a service and/or application), network analysis device 12 may further correlate the received device interface latency and/or queue length to each application. associated with the traversal path of each network flow to a particular service and/or application.

As a fourth example, network analysis device 12 may receive hop-by-hop (or per-hop) latency information for each network flow from a service node 24 (e.g., implementing a per-hop latency generation service device) via path 32. In particular, when production network packets are sampled at each network device 14-1, the packets may be mirrored and timestamp information may be inserted by each network device 14-1 into the sampled packets. These sampled packets containing timestamps of when they are processed by each network device 14-1 may then be sent to service node 24. Based on these timestamps, service node 24 may obtain per-hop latencies (e.g., by taking a difference between two timestamps to arrive at a per-hop latency).

To illustrate this, consider a scenario in which a production network packet traverses through a first network device 14-1, and then a second (adjacent) network device 14-1. As the production network packet traverses through the first network device 14-1, the first network device 14-1 may generate a first mirrored or sampled version of the production network packet containing a first timestamp. As the production network packet traverses through the second network device 14-1, the second network device 14-1 may generate a second mirrored or sampled version of the production network packet containing a second timestamp later than the first timestamp. Service node 24 may receive both versions of the mirrored packets and calculate a difference between the first and second timestamps. The difference may be indicative of the per-hop latency (e.g., the latency between the first and second network devices 14-1).

Service node 24 may calculate the per-hop latency for each pair of network devices in the traversal path of each network flow, thereby providing hop-by-hop latency information for the network flows. Network analysis device 12 may receive this hop-by-hop latency information on a per network flow basis from service node 24. If desired, network analysis device 12 may periodically (e.g., based on an expiry of a timer or a criterion being met at service node 24) receive the hop-by-hop latency information. Using the received application host resource information (which associates a network flow to a service and/or application), network analysis device 12 may further correlate the received hop-by-hop latency information to each application.

As a fifth example, network analysis device 12 may receive TCP (Transmission Control Protocol) session information such as end-to-end TCP analysis from one or more service nodes 24 and/or monitoring network controller 26. In particular, each application may include services or workloads that establish corresponding TCP sessions (e.g., each TCP session resulting in two network flows in opposite directions). One or more service nodes 24 may receive mirrored (e.g., tapped) network traffic belonging to each TCP session and associate each TCP session with the corresponding application based on the tapped network traffic.

One or more services nodes 24 may generate and/or gather performance metrics for each TCP session based on the tapped network traffic. The performance metrics ultimately obtained by service node 24 may include roundtrip time (RTT) or roundtrip latency (e.g., the time between the sending of a packet and the reception of the acknowledgement for the packet), number of retransmissions, congestion notifications (e.g., Explicit Congestion Notifications (ECNs)), TCP window size, flight size, reaction time, and/or other TCP metrics. Using the received application host resource information (which associates a network flow to a service and/or application), network analysis device 12 may further correlate the received TCP performance metrics information for each TCP session to each application.

In general, network analysis device 12 may receive one or more types of network performance metrics with data sets each identifiable with a particular network flow (e.g., having the same five-tuple, which refers to source and destination IP addresses, source and destination L4 ports, and protocol). Network analysis device 12 may aggregate each type of network performance metric data sets (e.g., obtained from network devices 14, service nodes 24, controller 26) for multiple network flows associated with the same application into a single aggregated data set for the particular application (e.g., based on the application host resource information from host resource management system 20).

The examples of metrics described in connection with FIG. 3 are merely illustrative and may be used in any combination and/or separately. If desired, other metrics may also be used instead of or in addition to those described in connection with FIG. 3.

Figure 4:
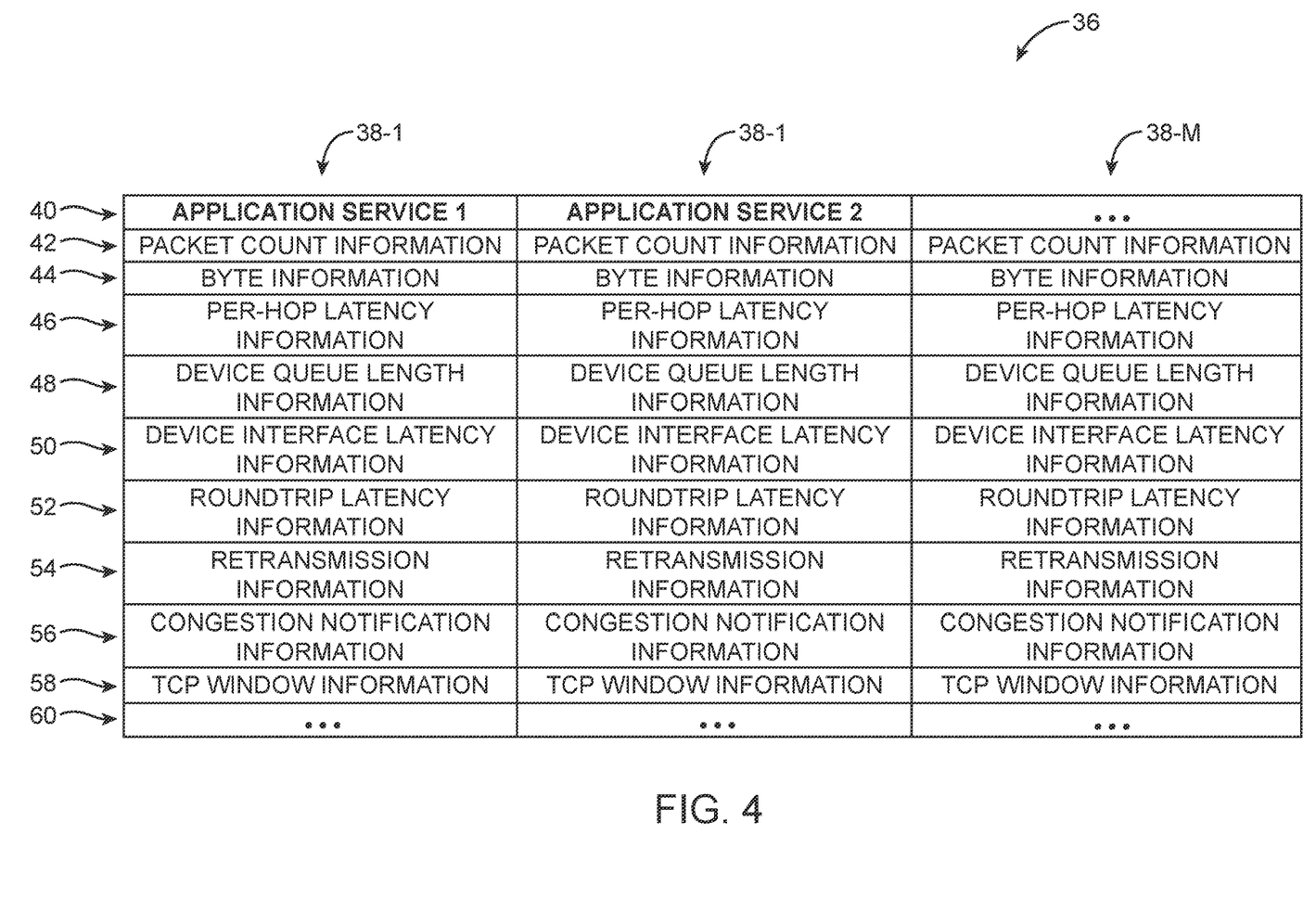
FIG. 4 is a diagram of illustrative types of network performance metrics gathered and/or generated by the network analysis device in accordance with some embodiments.

FIG. 4 is a diagram of an illustrative per-application, or more specifically per-application-service, representation of network performance metrics data aggregated and organized on a per application service basis. As shown in FIG. 4, each column 38 may be associated with network performance metrics data for a particular application service as identified in row 40 (e.g., with groups of application services belonging to the corresponding applications). The network performance metrics data may include different types of metrics data, with each row in rows 42-58 corresponding to a different type of metrics data obtained for each application service for the corresponding application.

In particular, network analysis device 12 (FIG. 3) may, for each application service, obtain the different types of metrics data on a more granular basis (e.g., on a per network flow basis, on a per device interface basis, on a per device queue basis, on a per-hop basis, on a per TCP session basis, etc.). Network analysis device 12 may then process the obtained different types of metrics data to generate aggregated metrics data to a per application service basis and/or may further analyze metrics of the same type obtained across multiple workloads or services for each application to identify any issues with the application. Network analysis device 12 may store the aggregated metrics data of the different types (as indicated in rows 42-58). If desired, network analysis device 12 may store the initially received raw (unprocessed) metrics data, filtered metrics data (e.g., after network analysis device 12 has removed outliers from the received raw metrics data), post-processing data (e.g., after network analysis device 12 has aggregated metrics data across time to generate a baseline metric data value and/or a normal expected deviation value), a threshold value stored at network analysis device 12 indicative of an anomalous event as identified by the type of metrics data (e.g., based on the baseline metric data value and a normal expected deviation value), and/or other data generated based on the obtained metric data.

In the example of FIG. 4, the types of metrics data include packet count information 42 and byte information 44 collected for each network flow, per-hop latency information 46 collected for each hop, network device queue information 48 and device interface latency information 50 collected for each device queue and interface, and roundtrip latency information 52, retransmission information 54, congestion notification information 56, and TCP window information 58 collected for each TCP session. If desired, network analysis device 12 may obtain, aggregate, and store any other suitable types of network performance metrics data 60 on a per application service basis.

Figure 5:
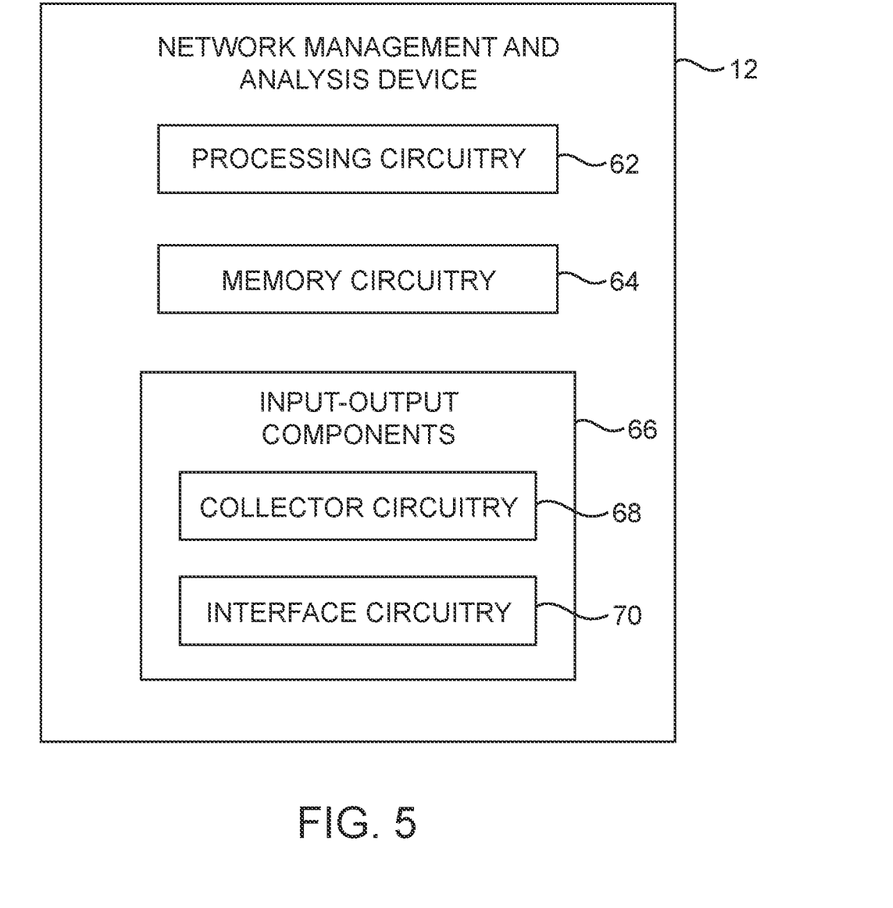
FIG. 5 is a diagram of an illustrative network management and analysis device having various hardware components in accordance with some embodiments.

FIG. 5 is a diagram of illustrative hardware components of computing equipment (e.g., implementing network analysis device 12) configured to perform the per-application aggregation and/or analysis operations described herein. As shown in FIG. 5, network analysis device 12 (e.g., described in connection with FIGS. 1-4) may include processing circuitry 62, memory circuitry 64, input-output components 66 such as collector circuitry 68 and interface circuitry 70, and if desired, other components.

In particular, processing circuitry 62 may include one or more processors or processing units based on microprocessors on general-purpose processors, microcontrollers, digital signal processors, programmable logic devices, application specific system processors (ASSPs), application specific integrated circuit (ASIC) processors, etc.

Memory circuitry 64 may include volatile memory such as dynamic random-access memory, static random-access memory, etc., and non-volatile memory such as hard-drive storage, solid-state storage, flash memory, etc. As examples, memory circuitry 64 may store the network performance metrics data as described in connection with FIG. 4, received information as described in connection with FIG. 3, and/or other information that facilitates the aggregation of network performance metrics data.

In general, the operations described herein relating to the operation of the network analysis device 12 and/or other relevant operations may be stored as (software) instructions on one or more non-transitory computer-readable storage media (e.g., memory circuitry 64) in network analysis device 12. The corresponding processing circuitry (e.g., processing circuitry 62) in network analysis device 12 for these one or more non-transitory computer-readable storage media may process the respective instructions to perform the corresponding network analysis device operations. In particular, processing circuitry 62 may execute (software) instructions stored on memory circuitry 64 to perform the per-application aggregation and/or analysis operations described herein, among other operations (e.g., network management operations).

Network analysis device 12 may include input-output components 66 (sometimes referred to herein as input-output circuitry 66) such as collector circuitry 68 and/or interface circuitry 70 that help facilitate the reception of network performance metrics data and/or application host resource information (e.g., from the various sources described in connection with FIGS. 2-4). As examples, input-output components 70 may include one or more input-output interfaces 70 or ports such as Ethernet ports or other types of network interface ports that provided connections to other network elements (e.g., switches, routers, service nodes, modems, controllers, host resource management systems, etc.) in the network, power ports through which power is supplied to network analysis device 12, or other ports. In general, input-output components 66 in network analysis device 12 may include communication interface components that provide a Bluetooth interface, a Wi-Fi interface, an Ethernet interface (e.g., one or more Ethernet ports), an optical interface, and/or other networking interfaces for connecting network device 10 to the Internet, a local area network, a wide area network, a mobile network, other types of networks, and/or to another network device, peripheral devices, and/or other electronic components. Collector circuitry 68 may be formed from one or more of these types of communication interface components and may be configured to form one or more communications paths 28, 30, 32, and 34, through which network performance metrics data, application host resource information, and/or other information (e.g., sampled packets) are collected.

If desired, network analysis device 12 may include other input-output devices such as devices that provide output to a user such as a display device and/or devices that gather input from a user such as one or more buttons. If desired, network analysis device 12 may include other components such as a system bus that couples the components of network analysis device 12 to one another, to power management components, etc. In general, each component within network analysis device 12 may be interconnected to processing circuitry 62 (and memory circuitry 64) via one or more paths that enable the reception and transmission of control signals and/or other data.

In some illustrative configurations described herein as an example, network management and analysis device 12 (e.g., along with host equipment 16, host resource management system 20, service nodes 24, controller 26, etc.) may be implemented on server computing equipment and may be housed in a distributed manner across multiple servers and/or server racks or may be housed in a dedicated server.

Figure 6:
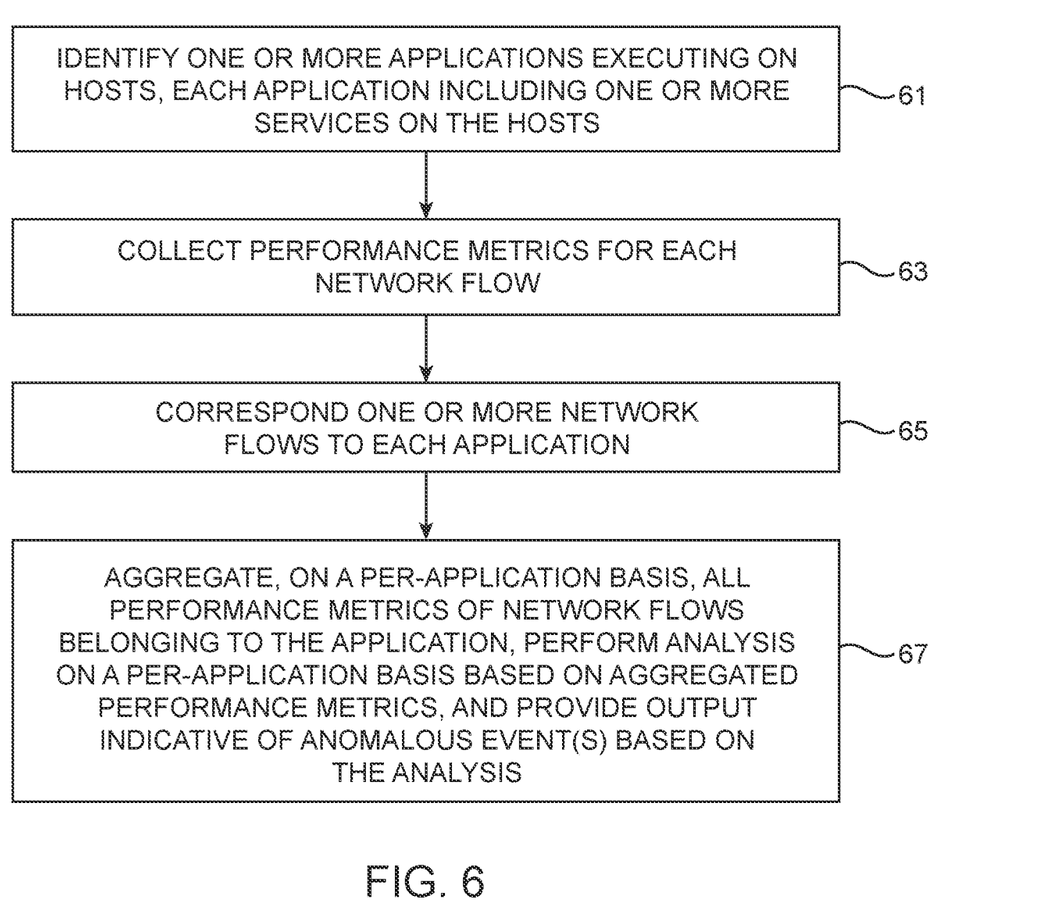
FIG. 6 is a flowchart of illustrative operations for obtaining per-application performance metrics in accordance with some embodiments.

FIG. 6 is a flowchart of illustrative operations performed by network analysis device 12 to aggregate and/or analyze metrics data on a per-application basis. These operations in FIG. 6 may be performed using one or more of components of network 8 such as a network analysis device 12 in FIG. 3, one or more network devices 14 in FIGS. 2 and 3, host resource management system 20 in FIGS. 2 and 3, one or more service nodes 24 in FIGS. 2 and 3, and/or one or more controllers such as controller 26 in FIGS. 2 and 3. The illustrative operations described in connection with FIG. 6 may generally be performed using corresponding processing circuitry on these components (e.g., by executing, on processing circuitry, software instructions stored on memory circuitry on network devices 14 and/or on server computing equipment implementing the other components of network 8).

At block 61, processing circuitry on host resource management system 20 may identify one or more applications executing on host devices (e.g., host equipment 16 in FIG. 2). Each application may include one or more services (or more generally processes) executing on server computing equipment. Each service may include one or more workloads, which can be distributed across different parts of server computing equipment (e.g., across different server racks). Host resource management system 20 may identify and store (e.g., at memory circuitry) application host resource information such as a collection of network addresses (e.g., IP address, L4 port, etc.) of server computing equipment associated with each application (e.g., each network address for a workload of each service of that application) or generally information indicative of the collection of network addresses. Host resource management system 20 may convey the application host resource information to network analysis device 12.

Accordingly, based on the received application information, network analysis device 12 (e.g., processing circuitry 62) may identify one or more applications executing on host equipment 16 and more specifically obtain network address information associated with each application.

At block 63, processing circuitry on one or more of network devices 14, service nodes 24, and controller 26 may collect different types of performance metrics data for each network flow. As illustrated in the examples described in connection with FIGS. 3 and 4, these different types of performance metrics data may be collected in a variety of manners. Regardless of how these types of performance metrics data are collected, they may ultimately be conveyed to network analysis device 12.

Accordingly, by receiving the performance metrics data (of different types) from the various components of network 8, network analysis device 12 (e.g., processing circuitry 62) may thereby collect performance metrics for each network traffic flow.

At block 65, processing circuitry 62 on network analysis device 12 may, based on the application host resource information received at block 61, associate or correlate one or more network traffic flows to each application. As an example, each network flow may be labeled with an indication of the application to which it belongs.

At block 67, processing circuitry 62 on network analysis device 12 may, based on the association established between network traffic flows and each application at block 63, aggregate the performance metrics data collected across constituent network flows for that application. In other words, processing circuitry 62 may, for each type of performance metric, aggregate (e.g., organize or label) performance metrics data gathered at a more granular level (e.g., per individual network traffic flow) as aggregated performance metrics data for a single application to which the individual network traffic flows belong.

In configurations described herein as an illustrative example, for each type of network performance metric, processing circuitry 62 on network analysis device 12 may remove some of the data in the collected data set during the aggregation process (e.g., to remove outlier data points associated with outlier network flows, outlier device interface latencies and queue lengths, TCP sessions, etc.) while the remaining data in the data set forms the aggregated data set characterizing the network performance of the application. If desired, processing circuitry 62 on network analysis device 12 may perform any other suitable aggregation and/or other types of data processing operations (e.g., averaging, filtering, etc.) on the collected data set to arrive at the final (aggregated) data set for the application. If desired, the collected data set obtained for each network flow may simply be labeled to identify a particular application without removing any (outlier) data to arrive at the final (aggregated) data set.

Further at block 67, processing circuitry 62 on network analysis device 12 may perform analysis and/or reporting on a per-application basis based on the aggregated performance metrics data. In some scenarios (e.g., for certain types of metrics), processing circuitry 62 may perform relatively simple analysis such as comparing different data points in the aggregated data sets to each other and/or to threshold values (e.g., a mean value of the aggregated data set, a median value of the aggregated data set, etc.) as the data is aggregated to determine anomalous events for an application. In other scenarios sometimes described herein as an illustrative example, processing circuitry 62 may perform a more comprehensive analysis based on historical data sets for corresponding performance metrics to determine anomalous events. Illustrative operations for performing the anomaly analysis based on historical data sets are further detailed in FIG. 7.

Further at block 67, processing circuitry 62 may report any anomalous events for an application to a user or network operator via an input-output device of network analysis device 12 and/or via peripheral devices such as display and/or computers coupled to network analysis device 12. In general, processing circuitry 62 may report the anomalous event by providing (user) output (e.g., a visual output to be displayed to a user, an alert or message to be conveyed to host equipment, etc.) and present corresponding output information as the output.

As examples, the information for output may include an indication (e.g., a message and/or alert) of an anomalous event, a type of anomalous event (e.g., the one or more types of performance metrics used to detect the anomalous event), the application for which the anomalous event has occurred, details of the anomalous event such as a typical range of normal data values, the unexpected or anomalous data value, location and/or cause of the anomalous event such as a responsible network flow and/or network device, etc., and/or any other suitable information for identifying the anomalous event. If desired, the output information may be presented to the user using a graphical user interface (e.g., provided through a display on network analysis device 12 and/or a peripheral display coupled to the network analysis device 12).

Figure 7:
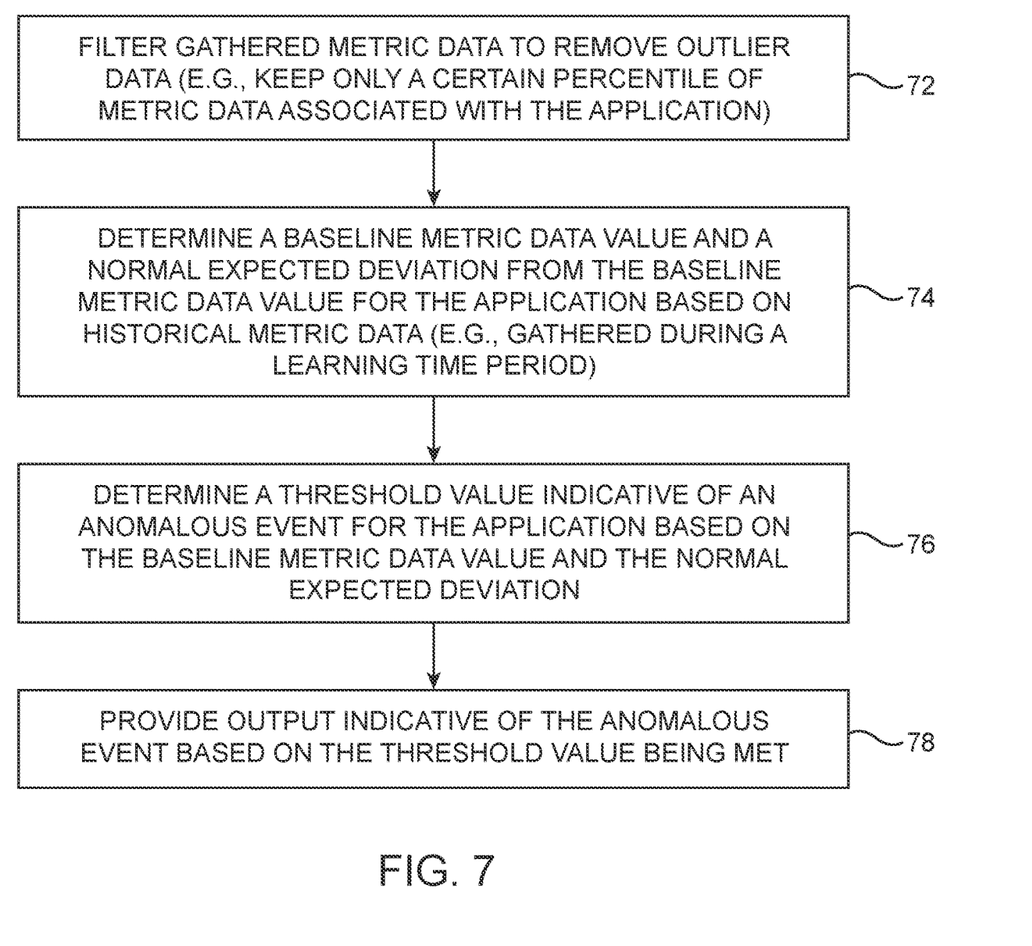
FIG. 7 is a flowchart of illustrative operations for analyzing and reporting per-application performance metrics in accordance with some embodiments.

FIG. 7 is a flowchart of illustrative operations performed by network analysis device 12 to observe and identify an anomalous event for each application (e.g., an anomalous per-hop latency event, an anomalous end-to-end latency event, an anomalous packet drop event, etc.). These operations in FIG. 7 may be performed using one or more of components of network 8 such as a network analysis device 12 in FIG. 3, one or more network devices 14 in FIGS. 2 and 3, host resource management system 20 in FIGS. 2 and 3, one or more service nodes 24 in FIGS. 2 and 3, and/or one or more controllers such as controller 26 in FIGS. 2 and 3. The illustrative operations described in connection with FIG. 7 may generally be performed using corresponding processing circuitry on these components (e.g., by executing, on processing circuitry, software instructions stored on memory circuitry on network devices 14 and/or on server computing equipment implementing the other components of network 8).

In the illustrative example of FIG. 7, the operations described in connection with blocks 72-78 may be performed as part of block 67 (e.g., as part of the flowchart in FIG. 6). If desired, the operations described in connection with blocks 72-78 may be performed separately from the operations described in connection with FIG. 6.

In general, the operations described in connection with blocks 72-78 may be performed separately for each type of performance metric to provide a distinct analysis and a distinct anomaly reporting criterion for each type of performance metric. If desired, performance metrics data from related types of performance metrics may be used in combination to provide analysis and/or the reporting criterion.

As a first example, network analysis device 12 may perform analysis for an aggregated data set of per-hop latency data for a given application and may report an anomalous event using per-hop latency data values as an anomaly detection criterion (e.g., to identify when abnormal per-hop latency data values are observed at network analysis device 12).

As a second example, network analysis device 12 may perform analysis for an aggregated data set of end-to-end latency data (e.g., TCP round trip latency data and/or any other TCP session metrics) for a given application and may report an anomalous event using end-to-end latency data values as an anomaly detection criterion (e.g., to identify when abnormal end-to-end latency data values are observed at network analysis device 12).

As a third example, network analysis device 12 may perform analysis for an aggregated data set of packet drop data for a given application and may report an anomalous event using packet drop data values as an anomaly detection criterion (e.g., to identify when abnormal packet drop data values are observed at network analysis device 12). In particular, the aggregated data set of packet drop values may be obtained by network analysis device 12 based on the number of packets reported at a pair of edge devices 14-1 per network flow (e.g., as described in connection with FIG. 3).

At blocks 72-78, network analysis device 12 may separately operate on a data set containing any one of these above-mentioned three types of metrics or other metrics for each application.

At block 72, processing circuitry 62 on network analysis device 12 may filter the gathered metric data for each application to remove any outlier data points. As an example, processing circuitry 62 may operate on a data set containing metric data of a given type gathered for network flows belonging to an application. As part of the aggregation operation, processing circuitry 62 may filter the data set by data values and keep data values below a desired percentile (e.g., 95th percentile, 90th percentile, etc.) of the data set associated with the application (e.g., remove data in the data set collected for network flows of the application with the highest 5%, 10%, etc., of latency data, remove data in the data set collected for network flows of the application with the highest 5%, 10%, etc., of packet drops, etc.). Processing circuitry 62 may thereby generate an aggregated data set containing one type of metric data for the application with outlier data removed.

In general, processing circuitry 62 may operate on (e.g., filter, average, perform numerical and/or statistical operations on, etc.) the data set containing data from multiple network flows (belonging the same application) to generate an aggregated data set.

At block 74, processing circuitry 62 on network analysis device 12 may determine a baseline metric data value and a normal expected deviation from the baseline metric data value for the type of metric data based on historical data values (e.g., gathered during a learning time period). In particular, prior to the data set being gathered and filtered at block 72, network analysis device 12 may have already gathered and filtered previous (historical) data sets (e.g., during a learning time period) to obtain a baseline metric data value and a normal expected deviation for the type of metric data. The learning time period, and the baseline metric data value and the normal expected deviation may be dynamically updated. As an example, the learning time period may be a rolling time period (e.g., having a fixed duration but a moving time interval), and the baseline metric data value and the normal expected deviation may be updated as more current data of the metric data type is gathered. If desired, the learning time period may have an increasing duration, and all past data sets may be used to update the baseline metric data value and the normal expected deviation.

At block 76, processing circuitry 62 on network analysis device 12 may determine a threshold value indicative of an anomalous event for the application based on the baseline metric data value and the normal expected deviation. In particular, the baseline metric data value and the normal expected deviation may indicate a range of normal metric data values. If desired, the threshold value may be different from but depend on the upper and lower bounds of the range of normal metric data values. As examples, the threshold value may be a score taking into account the upper and lower bounds of the range, a (user-)adjustable parameter indicating sensitivity to anomalous events (e.g., how far away from the normal range is anomalous), a duration and/or timing of the anomalous event (e.g., whether the observation indicates a normal gradual shift and/or an abrupt abnormal disruption), and/or any other desired parameters.

At block 78, processing circuitry 62 on network analysis device 12 may provide (user) output alerting the user and/or indicating to the user that an anomalous event has occurred based on the threshold value being met (e.g., exceeded) based on observed metric data values (e.g., in the filtered data set described in connection with block 72). Output methods and output information similar to those described in connection with block 67 in FIG. 6 may also be used at block 78.

The operations described in connection with FIG. 7 may be independently performed by network analysis device 12 per type of metric data and per application. Configured in this manner, network analysis device 12 may independently confirm issues with a particular application (e.g., if anomalous events are independently indicated by multiple different types of metrics). If desired, network analysis device 12 may provide (user) output in response to detection of multiple anomalous events occurring based on different types of metrics.

The operations described in connection with FIGS. 6 and 7 are merely illustrative. If desired, each block in the flowcharts (and the operations described therein) may occur in any suitable order (e.g., in a different order than those shown in FIGS. 6 and 7) and/or one or more operations for one block may be performed concurrently with one or more operations for another block. If desired, additional operations may be performed as part of one or more blocks and/or some described operations may be omitted from one or more blocks.

The methods and operations described above in connection with FIGS. 1-7 may be performed by the components of the network device(s) and/or server or other computing equipment (e.g., implementing network analysis device 12, host equipment 16, host resource management system 20, service nodes 24, and/or controller 26) using software, firmware, and/or hardware (e.g., dedicated circuitry or hardware). Software code for performing these operations may be stored on non-transitory computer readable storage media (e.g., tangible computer readable storage media) stored on one or more of the components of the network device(s) and/or server or other computing equipment. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s) and/or server or other computing equipment (e.g., processing circuitry 62 in network analysis device 12 of FIG. 5).

The foregoing is merely illustrative and various modifications can be made to the described embodiments. The foregoing embodiments may be implemented individually or in any combination.

What is claimed is:

1. A method of network traffic analysis, the method comprising:
   receiving network performance metrics data for each network flow in a plurality of network flows;
   receiving application host resource information for an application indicative of a subset of network flows in the plurality of network flows belonging to the application;
   aggregating the network performance metrics data for the subset of network flows to obtain network performance metrics data for the application; and
   providing an output indicating an anomalous event for the application based on the obtained network performance metrics data for the application.

2. The method of claim 1, wherein aggregating the network performance metrics data for the subset of network flows comprises filtering the network performance metrics data for the subset of the network flows to remove some of the network performance metrics data for the subset of network flows.

3. The method of claim 2, wherein aggregating the network performance metrics data for the subset of network flows comprises obtaining a baseline data value and an expected deviation from the baseline data value based on historical network performance metrics data for the subset of network flows during a learning time period.

4. The method of claim 3, wherein the baseline data value and the expected deviation from the baseline data value are dynamically updated as the learning time period is updated.

5. The method of claim 3, wherein aggregating the network performance metrics data for the subset of network flows comprises determining a threshold value indicative of the anomalous event based on the baseline data value and the expected deviation.

6. The method of claim 5 further comprising:
   obtaining a performance metrics data value as the network performance metrics data for the subset of network flows during a monitoring time period, wherein providing the output indicating the anomalous event for the application is in response to determining that the performance metrics data value exceeds the threshold value.

7. The method of claim 6, wherein providing the output comprises providing a message indicating the anomalous event to be displayed as user output.

8. The method of claim 2, wherein filtering the network performance metrics data for the subset of the network flows comprises removing outlier data having data values above a percentile of data values in the network performance metrics data.

9. The method of claim 1, wherein the application host resource information identifies network addresses of host equipment executing workloads for the application and wherein the subset of network flows are associated with the network addresses of host equipment.

10. The method of claim 9, wherein the network performance metrics data for the subset of network flows comprises network device interface information for network devices through which the subset of network flows traverses.

11. The method of claim 9, wherein the network performance metrics data for the subset of network flows comprises per-hop latency between network devices through which the subset of network flows traverses.

12. The method of claim 9, wherein the network performance metrics data for the subset of network flows comprises TCP (Transmission Control Protocol) metrics associated with TCP sessions containing the subset of network flows.

13. The method of claim 9, wherein the network performance metrics data for the subset of network flows comprises packet drop information for the subset of network flows.

14. The method of claim 13 further comprising:
receiving packet count values from edge network devices through which the subset of network flows traverse; and
generating packet drop information based on differences between pairs of packet count values from corresponding pairs of the edge network devices, each pair being associated with a network flow in the subset of network flows.

15. A network traffic analysis device comprising:
input-output circuitry configured to receive application host resource information that identifies end host network addresses from a host resource management system and to receive network performance metrics data for a plurality of network flows;
processing circuitry configured to identify a corresponding set of network flows in the plurality of network flows belonging to an application based on the application host resource information and to associate the network performance metrics data for the set of network flows to the application; and
memory circuitry configured to store at least a portion of the network performance metrics data for the set of network flows as network performance metrics data for the application, wherein the processing circuitry is configured to identify an anomalous event for the application based on the stored portion of the network performance metrics data.

16. The network traffic analysis device of claim 15, wherein the input-output circuitry is configured to receive the network performance metrics data from at least a network switch in a production network and a service node coupled to a monitoring network that receives tapped network traffic from the production network.

17. The network traffic analysis device of claim 15, wherein the processing circuitry is configured to determine a baseline data value for the network performance metric data and a normal expected deviation from the baseline data value based on historical network performance metric data and is configured to identify the anomalous event based at least in part on the baseline data value and the normal expected deviation.

18. One or more non-transitory computer-readable storage media comprising computer-executable instructions that, when executed by one or more processors for a network analysis device, cause the one or more processors to:
obtain per-hop latencies between adjacent pairs of network devices in a production network for each network flow in a plurality of network flows;
obtain TCP (Transmission Control Protocol) metrics for each network flow in the plurality of network flows;
obtain packet drop information for each network flow in the plurality of network flows; and
obtain network addresses of workloads associated with an application executing on host equipment;
aggregate the per-hop latencies, the TCP metrics, and the packet drop information for a subset of network flows in the plurality of network flows belonging to the application as at least part of aggregated network performance metrics for the application; and
output an indication of an anomalous event for the application based on the aggregated network performance metrics for the application.

19. The one or more non-transitory computer-readable storage media of claim 18 further comprising computer-executable instructions that, when executed by the one or more processors for the network analysis device, cause the one or more processors to:
obtain device interface latencies of the network devices in the production network for each network flow in the plurality of network flows; and
aggregate the device interface latencies for the subset of network flows as at least part of the aggregated network performance metrics for the application.

20. The one or more non-transitory computer-readable storage media of claim 18, wherein the indication of the anomalous event comprises an indication of a type of network performance metrics with which the anomalous event detected.

* * * * *